US011319415B2

(12) United States Patent
Moritani et al.

(10) Patent No.: US 11,319,415 B2
(45) Date of Patent: May 3, 2022

(54) METHOD AND APPARATUS FOR MANUFACTURING RESIN PARTICLES

(71) Applicant: RICOH COMPANY, LTD., Tokyo (JP)

(72) Inventors: Tatsuru Moritani, Kanagawa (JP); Naoki Shiraishi, Kanagawa (JP); Tadahiko Morinaga, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 194 days.

(21) Appl. No.: 16/363,375

(22) Filed: Mar. 25, 2019

(65) Prior Publication Data
US 2019/0292333 A1 Sep. 26, 2019

(30) Foreign Application Priority Data
Mar. 26, 2018 (JP) .............................. JP2018-058449

(51) Int. Cl.
C08J 3/14 (2006.01)
B01J 2/06 (2006.01)
B01J 2/18 (2006.01)
C08F 14/22 (2006.01)
C08G 63/08 (2006.01)
C08J 3/11 (2006.01)
(Continued)

(52) U.S. Cl.
CPC . C08J 3/14 (2013.01); B01J 2/06 (2013.01); B01J 2/18 (2013.01); C08F 14/22 (2013.01); C08G 63/08 (2013.01); C08J 3/11 (2013.01); B29B 9/10 (2013.01); B29B 9/12 (2013.01); B29B 2009/125 (2013.01)

(58) Field of Classification Search
CPC ... C08J 3/14; C08J 3/11; C08J 2367/02; C08J 2327/16; C08J 3/12; C08J 2429/04; C08J 2367/04; B01J 2/06; B01J 2/18; C08F 14/22; C08G 63/08; B29B 9/12; B29B 9/10; B29B 2009/125
See application file for complete search history.

(56) References Cited

U.S. PATENT DOCUMENTS 8,202,540 B1 * 6/2012 Muller ........................ C08J 3/12
424/489
9,877,922 B2 * 1/2018 Lee .......................... A61K 9/1635
(Continued)

FOREIGN PATENT DOCUMENTS

CN 103201319 7/2013
CN 105189617 12/2015
(Continued)

OTHER PUBLICATIONS

Extended European Search Report dated Aug. 30, 2019, in Patent Application No. 19165001.9, 23 pages.
(Continued)

Primary Examiner — Nahida Sultana
(74) Attorney, Agent, or Firm — Grüneberg and Myers PLLC

(57) ABSTRACT

A method for manufacturing resin particles is provided. The method includes the steps of: dissolving a resin free of poly(lactic-co-glycolic acid) (PLGA) in a good solvent of the resin to prepare a resin solution; and discharging the resin solution from at least one discharge hole having an inner diameter of less than 1,000 μm into a poor solvent of the resin to form resin particles.

16 Claims, 5 Drawing Sheets

(51) Int. Cl.
*B29B 9/12* (2006.01)
*B29B 9/10* (2006.01)

(56) References Cited

U.S. PATENT DOCUMENTS

| | | |
|---|---|---|
| 2008/0286679 A1 | 11/2008 | Norikane et al. |
| 2009/0042118 A1 | 2/2009 | Suzuki et al. |
| 2009/0269414 A1 | 10/2009 | Lee et al. |
| 2009/0317735 A1 | 12/2009 | Ohtani et al. |
| 2010/0055590 A1 | 3/2010 | Honda et al. |
| 2010/0104970 A1 | 4/2010 | Norikane et al. |
| 2011/0007116 A1 | 1/2011 | Ohgaki |
| 2011/0306539 A1* | 12/2011 | Shen ............... A61P 23/02 514/1.1 |
| 2012/0056342 A1* | 3/2012 | Koslow ............... C03B 37/045 264/8 |
| 2012/0094231 A1 | 4/2012 | Norikane et al. |
| 2012/0270147 A1 | 10/2012 | Katoh et al. |
| 2013/0010035 A1 | 1/2013 | Norikane et al. |
| 2013/0034810 A1 | 2/2013 | Norikane et al. |
| 2013/0241983 A1 | 9/2013 | Aoki et al. |
| 2013/0273188 A1 | 10/2013 | Takahashi et al. |
| 2014/0038100 A1 | 2/2014 | Katoh et al. |
| 2014/0097267 A1 | 4/2014 | Shitara et al. |
| 2014/0141110 A1 | 5/2014 | Katoh et al. |
| 2014/0242514 A1 | 8/2014 | Inoue et al. |
| 2014/0275365 A1 | 9/2014 | Kalayaraman et al. |
| 2014/0292947 A1 | 10/2014 | Norikane et al. |
| 2015/0037427 A1* | 2/2015 | Benita ............... A61K 9/5153 424/499 |
| 2015/0108671 A1 | 4/2015 | Norikane et al. |
| 2015/0183928 A1 | 7/2015 | Takezaki et al. |
| 2016/0145391 A1 | 5/2016 | Kalyanaraman et al. |
| 2017/0050204 A1 | 2/2017 | Shitara et al. |
| 2018/0085314 A1 | 3/2018 | Morinaga et al. |
| 2019/0076361 A1 | 3/2019 | Onoue et al. |

FOREIGN PATENT DOCUMENTS

| | | |
|---|---|---|
| JP | 2007-199463 | 8/2007 |
| JP | 2008-292976 | 12/2008 |
| JP | 2009102457 | 5/2009 |
| JP | 2010-102195 | 5/2010 |
| JP | 2011-111429 | 6/2011 |
| JP | 2011-194675 | 10/2011 |
| JP | 2013-212494 | 10/2013 |
| JP | 2014184429 | 10/2014 |
| JP | 2017-14467 A | 1/2017 |
| WO | WO2015/083489 A1 | 6/2015 |

OTHER PUBLICATIONS

Chinese Office Action dated Aug. 20, 2021, in Chinese Patent Application No. 201910225515.4, with English translation, 16 pages.

Japanese Office Action dated Dec. 14, 2021 in Japanese Application No. 2018-058449, with Englis translation, 7 pages.

* cited by examiner

METHOD AND APPARATUS FOR MANUFACTURING RESIN PARTICLES

CROSS-REFERENCE TO RELATED APPLICATIONS

This patent application is based on and claims priority pursuant to 35 U.S.C. § 119(a) to Japanese Patent Application No. 2018-058449, filed on Mar. 26, 2018, in the Japan Patent Office, the entire disclosure of which is hereby incorporated by reference herein.

BACKGROUND

Technical Field

The present disclosure relates to a method for manufacturing resin particles and an apparatus for manufacturing resin particles.

Description of the Related Art

Polymer nanoparticles are one of the functional materials attracting attention in the field of nanotechnology, and their application to a wide range of fields including pharmaceutical field and electronics field is being studied.

For example, nanoparticles of poly(lactic-co-glycolic acid) (PLGA) are applied to a drug delivery system (DDS), and nanoparticles of polyvinylidene fluoride (PVDF) are used as a resin for paint.

As a method of manufacturing any of the above-described nanoparticles, a manufacturing method using an emulsion solvent diffusion method (ESD method) in water has been proposed. In the ESD method, an organic polymer is dissolved in an organic solvent that is a good solvent and then diffused in a poor solvent such as water to obtain nanoparticles.

In addition, as a method for manufacturing nanoparticles other than the ESD method, a method including ejecting a resin solution from an inkjet head into a gas phase and drying the resin solution has been proposed.

SUMMARY

According to an embodiment of the present invention, a method for manufacturing resin particles is provided. The method includes the steps of: dissolving a resin free of poly(lactic-co-glycolic acid) (PLGA) in a good solvent of the resin to prepare a resin solution; and discharging the resin solution from at least one discharge hole having an inner diameter of less than 1,000 µm into a poor solvent of the resin to form resin particles.

According to an embodiment of the present invention, an apparatus for manufacturing resin particle is provided. The apparatus includes a resin solution container, a solution discharger, and a poor solvent container. The resin solution container contains a resin solution in which a resin free of poly(lactic-co-glycolic acid) is dissolved in a good solvent of the resin. The solution discharger is connected to the resin solution container, and has at least one discharge hole having an inner diameter of less than 1,000 µm. The poor solvent container contains a poor solvent of the resin.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
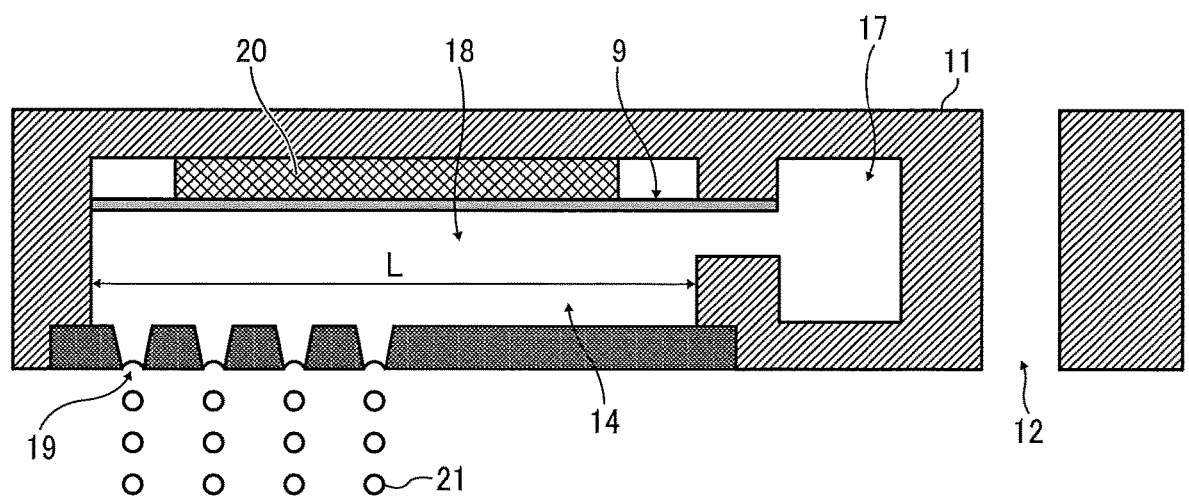
FIG. 1 is a cross-sectional view of a liquid-column-resonant liquid droplet discharger according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to an embodiment of the present invention, a method for manufacturing resin particles having a small environmental load and excellent production efficiency is provided.

The inventors of the present invention have studied a method for manufacturing resin particles having a small environmental load and excellent production efficiency and found the following findings.

In the techniques described in JP-4856752-B (corresponding to JP-2011-111429-A) and JP-6007992-B (corresponding to WO2015/083489), the good solvent used in the emulsion solvent diffusion (ESD) method is generally an organic solvent, and the concentration of the resin solution is set to 1% by mass or less in order to obtain fine resin particles. In particular, in order to obtain fine particles having a particle diameter of 100 nm or less, the concentration of the resin solution should be more lowered and a large amount of organic solvent is required for production of nanoparticles, resulting in a large environmental load and poor production efficiency.

In addition, with the technique described in JP-2013-212494-A in which a resin solution is ejected into a gas phase and dried to be solidified, the obtained particles have a particle diameter of about several micrometers. It is impossible to produce fine particles having a particle diameter of 100 nm or less with this method.

As a result of extensive studies, the inventors of the present invention have found that the below-described method for manufacturing resin particles is effective for manufacturing resin particles having a particle diameter of less than 100 nm with a low environmental load and excellent production efficiency, even with use of a resin solution having a high concentration. Method for Manufacturing Resin Particles The method for manufacturing resin particles according to an embodiment of the present invention includes the processes of: dissolving a resin free of poly(lactic-co-glycolic) acid (PLGA) in a good solvent of the resin to obtain a resin solution; and discharging the resin solution from at least one discharge hole having an inner diameter of less than 1,000 µm into a poor solvent of the resin to form resin particles (hereinafter "particle forming process"). The method may further include other processes as necessary.

The method for manufacturing resin particles according to an embodiment of the present invention falls into emulsion solvent diffusion methods ("ESD methods") that are spheroidizing techniques using an interdiffusion between a good solvent and a poor solvent caused by a difference in surface tension therebetween.

In the ESD method using a resin, a solution in which the resin is dissolved is introduced into water or an aqueous organic solvent, each of which is a poor solvent of the resin, to be brought into contact therewith, whereby the solution containing the resin is diffused and the resin is brought into contact with the poor solvent and crystallized to become fine spherical particles.
Particle Forming Process The particle forming process is not particularly limited and can be appropriately selected depending on the purpose as long as it is a process of discharging the resin solution from one or more discharge holes into the poor solvent of the resin to form resin particles. It is preferable that the particle forming process includes a liquid flow treatment and a liquid circulation treatment.
Resin Solution The resin solution is not particularly limited and can be appropriately selected according to the purpose as long as it is a solution in which the resin is dissolved in a good solvent of the resin.

The resin solution is obtained by dissolving the resin in a good solvent of the resin.
Resin The resin is not particularly limited and can be appropriately selected according to the purpose as long as it is a resin free of poly(lactic-co-glycolic) acid (PLGA). Examples of the resin include, but are not limited to, biodegradable resins and thermoplastic resins.

Examples of the biodegradable resins include, but are not limited to, polylactic acid (PLA).

Examples of the thermoplastic resins include, but are not limited to, polyvinylidene fluoride (PVDF).
Polylactic Acid (PLA)

Polylactic acid (PLA) is a polymer of lactic acid.

Hereinafter, "polylactic acid" may be referred to as "PLA".

The weight average molecular weight of the polylactic acid (PLA) is not particularly limited and may be appropriately selected according to the purpose, but is preferably in the range of from 5,000 to 100,000, more preferably from 10,000 to 70,000, much more preferably from 10,000 to 50,000, and particularly preferably from 10,000 to 30,000.

The polylactic acid (PLA) can be produced by, for example, ring-opening polymerization of a lactide monomer.

The polylactic acid (PLA) may be a commercially available product. Such products can be available from, for example, Wako Pure Chemical Industries, Ltd. and Taki Chemical Co., Ltd.

In the case where the resin contains a second component other than PLA, the content of PLA with respect to the total amount of the resin is not particularly limited and may be appropriately selected according to the purpose, but is preferably 50% by mass or more, more preferably from 50% to 99% by mass, much more preferably from 75% to 99% by mass, and particularly preferably from 80% to 99% by mass.
Polyvinylidene Fluoride (PVDF)

Polyvinylidene fluoride (PVDF) is a polymer of 1,1-difluoroethylene.

Hereinafter, "polyvinylidene fluoride" may be referred to as "PVDF".

The polyvinylidene fluoride (PVDF) can be produced by, for example, radical polymerization of 1,1-difluoroethylene monomer.

The polyvinylidene fluoride (PVDF) may be a commercially available product. Such products can be available from, for example, Wako Pure Chemical Industries, Ltd. and Taki Chemical Co., Ltd.

In the case where the resin contains a second component other than PVDF, the content of PVDF with respect to the total amount of the resin is not particularly limited and may be appropriately selected according to the purpose, but is preferably 50% by mass or more, more preferably from 50% to 99% by mass, much more preferably from 75% to 99% by mass, and particularly preferably from 80% to 99% by mass, for stability in manufacturing nanoparticles.
Good Solvent The good solvent is not particularly limited and can be appropriately selected according to the purpose. Examples of the good solvent include, but are not limited to, alcohols, ketones, ethers, acetonitrile, and tetrahydrofuran.

Specific examples of the alcohols include, but are not limited to, alcohols having 1 to 4 carbon atoms. Specific examples of the alcohols having 1 to 4 carbon atoms include, but are not limited to, methanol, ethanol, propanol, and butanol.

Specific examples of the ketones include, but are not limited to, ketones having 3 to 6 carbon atoms. Specific examples of the ketones having 3 to 6 carbon atoms include, but are not limited to, acetone, methyl ethyl ketone, and cyclohexanone.

Specific examples of the ethers include, but are not limited to, ethers having 2 to 6 carbon atoms. Specific examples of the ethers having 2 to 6 carbon atoms include, but are not limited to, dimethyl ether, methyl ethyl ether, and diethyl ether.

Each of these materials can be used alone or in combination with others.

In particular, a mixed solvent of an alcohol with a ketone is preferable, and a mixed solvent of ethanol and acetone is more preferable.

In the present disclosure, the "good solvent" refers to a solvent that dissolves the resin in a large amount. The "poor solvent" refers to a solvent that dissolves the resin in a small amount or that does not dissolve the resin.

The good solvent and the poor solvent can be defined by the mass of the resin soluble in 100 g of the solvent at 25 degrees C. In the present disclosure, the good solvent is preferably capable of dissolving the resin in an amount of 0.1 g or more. By contrast, the poor solvent is preferably capable of dissolving the resin in an amount of 0.05 g at most.

The content of the resin in the resin solution is not particularly limited and may be appropriately selected according to the purpose. For example, when the solvent is a mixed solvent of acetone and ethanol, the concentration (content) of the resin is preferably 5.0% by mass or less, and more preferably from 0.1% to 5.0% by mass. When the concentration is 5.0% by mass or less, aggregation of the particles and widening of the particle size distribution are prevented.

By controlling the content of the resin in the resin solution, it is possible to control the particle diameter of the resin particles to be manufactured to some extent.

Poor Solvent

The poor solvent is not particularly limited and may be appropriately selected according to the purpose, but water is preferable. In order to further secure stability of the manufactured resin particles, a stabilizer may be contained in the poor solvent.

The stabilizer is not particularly limited and may be appropriately selected depending on the purpose. Preferred examples thereof include, but are not limited to, hydroxypropyl cellulose (HPC), hydroxypropyl methylcellulose (HPMC), and polyvinyl alcohol (PVA). Preferably, the concentration of the stabilizer is 5% by mass or less.

Specific examples of the poor solvent include, but are not limited to, an aqueous solution of PVA.

Discharge Hole

The discharge hole is not particularly limited and can be appropriately selected according to the purpose as long as it has an inner diameter of less than 1,000 μm.

The inner diameter is preferably 1.0 μm or more and less than 1,000 μm, more preferably from 1.0 to 500 μm, and much more preferably from 1.0 to 50 μm.

In a case in which the discharge hole is not in a true circle shape, the discharge hole has an area equivalent to that of a true circle having a diameter of less than 1,000 μm. The inner diameter of the discharge hole is calculated in terms of equivalent circle diameter (i.e., the diameter of the circle having the same area).

The discharge hole may or may not be immersed in the poor solvent, but is preferably immersed in the poor solvent to prevent the resin solution from drying in the discharge hole and to prevent discharge failure due to drying of the resin solution in the discharge hole. In other words, the discharge hole is preferably in contact with the poor solvent.

The distance to immerse the discharge hole in the poor solvent is not particularly limited and may be appropriately selected according to the purpose, but it is preferably from 1.0 to 10 mm, more preferably from 2.0 to 5.0 mm. In other words, the discharge hole is preferably immersed in the poor solvent for a distance of from 1.0 to 10 mm, more preferably from 2.0 to 5.0 mm.

Solution Discharger

The discharge hole may be provided in a solution discharger.

Specific examples of the solution discharger are listed below, but are not limited thereto.

(i) A flat plate nozzle discharger, such as an inkjet nozzle, that discharges a solution from holes formed on a flat plate by applying a pressure to the solution.

(ii) A discharger that discharges a solution from holes having an amorphous shape, such as those of an SPG (Shirasu Porous Glass) membrane, by applying a pressure to the solution.

(iii) A discharger that discharges a solution from holes as liquid droplets by applying a vibration to the solution.

The above discharger (iii) is of several types: membrane vibration dischargers, Rayleigh fission dischargers, liquid vibration dischargers, and liquid column resonance dischargers. Each of these dischargers may apply a pressure to the solution when discharges the solution. Two or more of these dischargers may be combined.

Examples of the membrane vibration dischargers include, but are not limited to, a discharger described in JP-2008-292976-A.

Examples of the Rayleigh fission dischargers include, but are not limited to, a discharger described in JP-4647506-B (corresponding to JP-2007-199463-A).

Examples of the liquid vibration dischargers include, but are not limited to, a discharger described in JP-2010-102195-A.

Among these dischargers, liquid column resonance dischargers, employing a liquid column resonance method, combined with a pressure applicator are preferable.

The liquid column resonance method is not particularly limited and can be appropriately selected according to the purpose. For example, the liquid column resonance method may include the processes of applying a vibration to the resin solution stored in a liquid-column-resonant liquid chamber to form a liquid-column-resonant standing wave; and discharging the resin solution from a discharge hole formed within an area corresponding to an antinode of the liquid-column-resonant standing wave in the direction of amplitude of the standing wave.

The liquid column resonance method is suitably performed by a liquid-column-resonant liquid droplet discharger to be described later.

Liquid Flow Treatment

The liquid flow treatment is not particularly limited and may be appropriately selected depending on the purpose as long as it is a treatment for causing the liquid of the poor solvent (hereinafter simply "the liquid") to flow when the resin solution is discharged into the liquid. The flow rate is preferably from 0.5 to 2.0 m/s, more preferably 1.0 m/s.

By performing the liquid flow treatment, coalescence of the resin particles can be prevented.

As a liquid flowing device for causing the liquid to flow include, a stirrer for stirring the liquid may be used. The stirrer is not particularly limited and may be appropriately selected according to the purpose. Examples of the stirrer include, but are not limited to, a stirring blade.

Liquid Circulation Treatment

In the particle forming process, it is preferable that the resin solution is discharged from the discharge hole into the liquid that is circulating for preventing coalescence of the resin particles.

Therefore, a liquid circulation treatment for circulating the liquid is preferably performed.

In the liquid circulation treatment, the liquid may be circulated within a poor solvent container having a circulation channel by using a pump as a circulator.

Good Solvent Removing Treatment

When circulating the liquid, the good solvent of the resin is accumulated in the liquid. As the good solvent is accumulated in the liquid, coalescence of the resin particles is likely to occur. In that respect, it is preferable that a good solvent removing treatment for removing the good solvent from within the circulating liquid is performed.

The good solvent removing treatment is not particularly limited and can be appropriately selected according to the purpose as long as the good solvent can be removed from within the liquid. For example, the good solvent removing treatment may include heating and/or decompressing the liquid to vaporize and remove the good solvent from within the liquid.

Other Processes

Examples of the other processes include, but are not limited to, a good solvent removing process and a filtration sterilization process.

Good Solvent Removing Process

The good solvent removing process is not particularly limited and can be appropriately selected according to the purpose as long as it is a process of removing the good solvent from the resulting resin particles. For example, the good solvent removing process may be a method in which the liquid containing the resin particles is subjected to a decompression treatment to volatilize only the good solvent of the resin and obtain a suspension containing the resin particles.

Filtration Sterilization Process

The filtration sterilization process is not particularly limited and can be appropriately selected according to the purpose as long as it is a process of filtering the suspension with a sterilization filter after the good solvent removing process.

The suspension to be subjected to the filtration may be diluted with the poor solvent or may not be diluted.

Prior to the filtration, it is preferable that the suspension is applied with ultrasonic waves. In this case, aggregation of the resin particles in the suspension is eliminated, and the resin particles easily pass through the filter.

The sterilization filter is not particularly limited and can be appropriately selected according to the purpose. Examples of the sterilization filter include, but are not limited to, a nylon membrane filter.

The filtration accuracy of the sterilization filter is not particularly limited and may be appropriately selected according to the purpose, but is preferably from 0.1 to 0.45 µm.

A commercially available product of the sterilization filter may be used. Examples of commercially available products include, but are not limited to, LifeASSURE™ nylon membrane filter cartridge (filtration accuracy: 0.1 µm).

Apparatus for Manufacturing Resin Particles

An apparatus for manufacturing resin particle according to am embodiment of the present invention includes: a resin solution container containing a resin solution in which a resin free of poly(lactic-co-glycolic acid) is dissolved in a good solvent of the resin; a solution discharger connected to the resin solution container, having at least one discharge hole having an inner diameter of less than 1,000 µm; and a poor solvent container containing a poor solvent of the resin. The apparatus may further include a liquid flowing device and other devices as necessary.

The apparatus for manufacturing resin particles according to an embodiment of the present invention is described in detail below. The same terms as the terms used to describe the method for manufacturing resin particles of according to an embodiment of the present invention have the same meanings as those described, unless detailed description is given below. Exemplary and preferred embodiments of the terms are the same as those exemplified to describe the method for manufacturing resin particles according to an embodiment of the present invention.

Resin Solution Container

The resin solution container is not particularly limited and can be appropriately selected according to the purpose as long as it is a container for containing the resin solution. The resin solution container may have or may not have flexibility.

The material of the resin solution container is not particularly limited and can be appropriately selected according to the purpose. For example, the resin solution container may be made of a resin or a metal.

The structure of the resin solution container is not particularly limited and can be appropriately selected according to the purpose. For example, the resin solution container may be a sealed container or a non-sealed container.

In the resin solution, the resin is dissolved in a good solvent of the resin.

Solution Discharger

The solution discharger is not particularly limited and can be appropriately selected according to the purpose as long as it has at least one discharge hole having an inner diameter of less than 1,000 µm.

The solution discharger is connected to the resin solution container. How to connect the solution discharger and the resin solution container is not particularly limited and can be appropriately selected according to the purpose as long as the resin solution can be supplied from the resin solution container to the solution discharger. For example, the solution discharger and the resin solution container may be connected with a piping (e.g., a pipe, a tube).

Preferably, the solution discharger has a vibration applicator that applies a vibration to the resin solution.

The vibration is not particularly limited and may be appropriately selected according to the purpose. For example, the frequency of the vibration is preferably 1 kHz or more, more preferably 150 kHz or more, and further preferably from 300 to 500 kHz. When the frequency is 1 kHz or more, a liquid column ejected from the discharge hole can be made into droplets with good reproducibility. When the frequency is 150 kHz or more, production efficiency can be improved.

Examples of the solution discharger having the vibration applicator include, but are not limited to, an inkjet apparatus. The inkjet apparatus may utilize, for example, a liquid column resonance method, a membrane vibration method, a liquid vibration method, a Rayleigh fission method, or a thermal method.

Poor Solvent Container

The poor solvent container is not particularly limited and can be appropriately selected according to the purpose as long as it is a container for containing the liquid of the poor solvent of the resin. The poor solvent container may have or may not have flexibility.

The material of the poor solvent container is not particularly limited and can be appropriately selected according to the purpose. For example, the poor solvent container may be made of a resin or a metal.

The poor solvent in the poor solvent container may or may not be stirred at the time of manufacturing the resin particles, but it is preferably stirred.

The discharge hole of the solution discharger may or may not be immersed in the poor solvent contained in the poor solvent container, but is preferably immersed in the poor solvent to prevent the resin solution from drying in the discharge hole and to prevent discharge failure due to drying of the resin solution in the discharge hole. In other words, the discharge hole of the solution discharger is preferably in contact with the poor solvent contained in the poor solvent container.

The distance to immerse the discharge hole of the solution discharger in the poor solvent contained in the poor solvent container is not particularly limited and may be appropriately selected according to the purpose, but it is preferably from 1.0 to 10 mm, more preferably from 2.0 to 5.0 mm. In other words, the discharge hole of the solution discharger is preferably immersed in the poor solvent contained in the poor solvent container for a distance of from 1.0 to 10 mm, more preferably from 2.0 to 5.0 mm.

Preferably, the poor solvent container has a circulation channel capable of circulating the liquid. The circulation channel capable of circulating the liquid may be, for example, a circulation channel composed only of a piping or a circulation channel having a piping and a tank.

Good Solvent Remover

When circulating the liquid, the good solvent of the resin is accumulated in the liquid. As the good solvent is accumulated in the liquid, coalescence of the resin particles is likely to occur. In that respect, it is preferable that a good solvent remover that removes the good solvent from within the circulating liquid is provided.

The good solvent remover is not particularly limited and can be appropriately selected according to the purpose as long as the good solvent can be removed from within the liquid. Examples of the good solvent remover include, but are not limited to, a heater that heats the liquid and a decompressor that decompresses the liquid. By using at least one of the heater and the decompressor, the good solvent can be vaporized and removed from within the liquid.

Liquid Flowing Device

The liquid flowing device is not particularly limited and can be appropriately selected according to the purpose as long as it causes the liquid of the poor solvent contained in the poor solvent container to flow. Examples of the liquid flowing device include, but are not limited to, a stirrer that stirs the liquid.

By using the liquid flowing device, coalescence of the resin particles can be prevented.

A liquid-column-resonant liquid droplet discharger, as one example of the solution discharger, is described in detail below.

FIG. 1 is a cross-sectional view of a liquid-column-resonant liquid droplet discharger 11. The liquid-column-resonant liquid droplet discharger 11 has a liquid common supply channel 17 and a liquid-column-resonant liquid chamber 18. The liquid-column-resonant liquid chamber 18 is communicated with the liquid common supply channel 17 disposed on its one end wall surface in a longitudinal direction. The liquid-column-resonant liquid chamber 18 has discharge holes 19 that discharge liquid droplets 21, on its one wall surface which is connected with its both longitudinal end wall surfaces. The liquid-column-resonant liquid chamber 18 also has a vibration generator 20 that generates high-frequency vibration for forming a liquid-column-resonant standing wave, on the wall surface facing the discharge holes 19. The vibration generator 20 is connected to a high-frequency power source. Further, an airflow passage 12 may be provided that supplies airflow for conveying the liquid droplets 21 discharged from the liquid-column-resonant liquid droplet discharger 11.

A resin solution 14 is let to flow into the liquid common supply channel 17 through a liquid supply tube by a liquid circulating pump and is supplied to the liquid-column-resonant liquid chamber 18 disposed within the liquid-column-resonant liquid droplet discharger 11. Within the liquid-column-resonant liquid chamber 18 filled with the resin solution 14, the vibration generator 20 generates a liquid-column-resonant standing wave, thereby forming a pressure distribution. The liquid droplets 21 are discharged from the discharge holes 19 provided within an area corresponding to an antinode of the liquid-column-resonant standing wave where the amplitude in pressure variation is large. The area corresponding to an antinode of the liquid-column-resonant standing wave is an area non-corresponding to a node thereof. Preferably, the area corresponding to an antinode is an area where the amplitude in pressure variation of the standing wave is large enough to discharge liquid droplets, more preferably, an area extending from a position at a local maximum amplitude of a pressure standing wave (i.e., a node of a velocity standing wave) toward a position at a local minimum amplitude for a distance±¼ of the wavelength.

Within the area corresponding to an antinode of the pressure standing wave, even in a case in which multiple discharge holes are provided, each of the multiple discharge holes can discharge uniform liquid droplets at a high degree of efficiency without causing clogging. After passing the liquid common supply channel 17, the resin solution 14 flows into a liquid return tube and returns to a resin solution container. As the liquid droplets 21 are discharged, the amount of the resin solution 14 in the liquid-column-resonant liquid chamber 18 is reduced and a suction force generated by the action of the liquid-column-resonant standing wave is also reduced within the liquid-column-resonant liquid chamber 18. Thus, the flow rate of the resin solution 14 supplied from the liquid common supply channel 17 is temporarily increased to fill the liquid-column-resonant liquid chamber 18 with the resin solution 14. After the liquid-column-resonant liquid chamber 18 is refilled with the resin solution 14, the flow rate of the resin solution 14 passing within the liquid common supply channel 17 is returned.

The liquid-column-resonant liquid chamber 18 in the liquid-column-resonant liquid droplet discharger 11 may be formed of joined frames made of a material having a high stiffness that does not adversely affect liquid resonant frequency of the liquid at drive frequency, such as metals, ceramics, and silicone. A length L between both longitudinal ends of the liquid-column-resonant liquid chamber 18, illustrated in FIG. 1, is determined based on a mechanism of liquid column resonance. Preferably, a plurality of multiple liquid-column-resonant liquid chambers 18 is provided to a single liquid droplet formation unit to drastically improve productivity. The number of the liquid-column-resonant liquid chambers 18 is not particularly limited, but is preferably from 1 to 2,000. Each of the liquid-column-resonant liquid chambers 18 is communicated with the liquid common supply channel 17 through each liquid supply channel. The liquid common supply channel 17 is communicated with multiple liquid-column-resonant liquid chambers 18.

The vibration generator 20 in the liquid-column-resonant liquid droplet discharger 11 is not limited to any particular device so long as it can be driven at a specific frequency. For example, the vibration generator 20 may be formed of a piezoelectric body and an elastic plate 9 attached to each other. The drive frequency of the vibration generator 20 is preferably 150 kHz or more, more preferably from 300 to 500 kHz, for improving productivity. The elastic plate 9 constitutes a part of the wall of the liquid-column-resonant liquid chamber 18 so that the piezoelectric body does not contact the liquid. The piezoelectric body may be made of a piezoelectric ceramic, such as lead zirconate titanate (PZT), which is generally laminated because of having a small displacement. The piezoelectric body may also be made of a piezoelectric polymer such as polyvinylidene fluoride (PVDF), crystal, or a single crystal of $LiNbO_3$, $LiTaO_3$, or $KNbO_3$. Preferably, the vibration generator 20 is disposed in each liquid-column-resonant liquid chamber 18 so as to control each liquid-column-resonant liquid chamber 18 independently. Alternatively, a single blockish vibrating material may be partially cut to fit the arrangement of the liquid-column-resonant liquid chambers 18 so as to control each liquid-column-resonant liquid chamber 18 independently through the elastic plate 9.

Preferably, the discharge holes 19 are arranged in a width direction of the liquid-column-resonant liquid chamber 18, so that a larger number of discharge holes 19 can be provided for improving production efficiency. Since the liquid-column-resonant frequency varies depending on the arrangement of the discharge holes 19, the liquid column resonant frequency is preferably adjusted monitoring the discharge condition of liquid droplets.

A mechanism of liquid droplet formation based on liquid column resonance is described in, for example, [0011]-[0020] of JP-2011-194675-A.

One example of the apparatus for manufacturing resin particles according to an embodiment of the present invention is described below with reference to the drawings.

Figure 2:
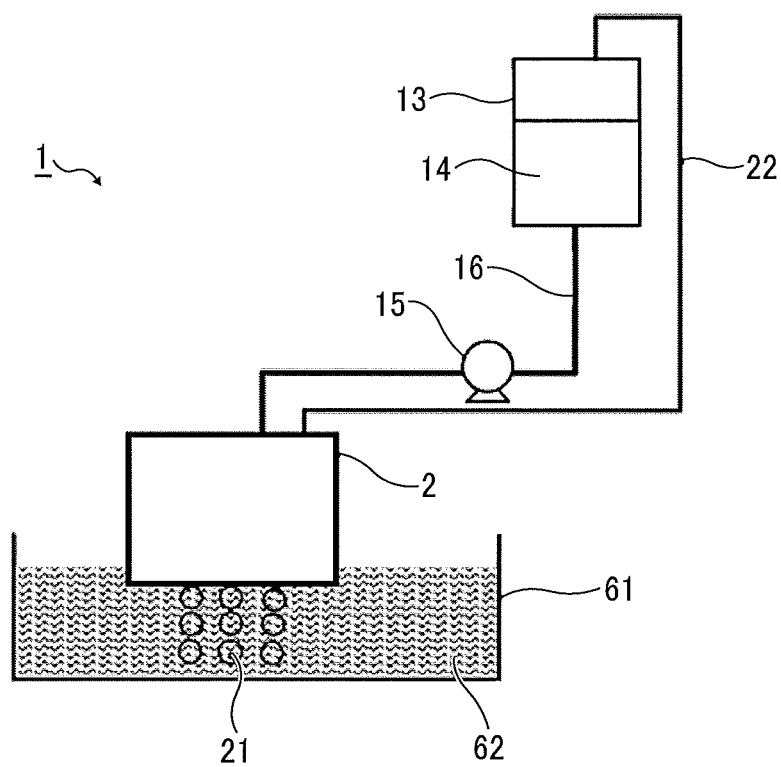
FIG. 2 is a schematic view of an apparatus for manufacturing resin particles according to an embodiment of the present invention.

FIG. 2 is a schematic view of an apparatus for manufacturing resin particles. An apparatus 1 for manufacturing resin particles includes a resin solution container 13, a solution discharger 2, and a poor solvent container 61 as major components. The solution discharger 2 is connected to the resin solution container 13 containing the resin solution 14. The solution discharger 2 is further connected to a liquid circulation pump 15 for supplying the resin solution 14 contained in the resin solution container 13 to the solution discharger 2 via a liquid supply pipe 16 and for pumping the resin solution 14 within the liquid supply pipe 16 to return the resin solution 14 to the resin solution container 13 via a liquid return pipe 22. The resin solution 14 can be constantly supplied to the solution discharger 2.

The solution discharger 2 may be equipped with the liquid-column-resonant liquid droplet discharger 11 illustrated in FIG. 1.

The resin solution 14 is discharged from the solution discharger 2 as liquid droplets 21 into a poor solvent 62 contained in the poor solvent container 61.

As the liquid droplets 21 and the poor solvent 62 come into contact with each other, the resin solution diffuses and the resin comes into contact with the poor solvent. As a result, the resin crystallizes to become fine spherical particles.

Another example of the apparatus for manufacturing resin particles according to an embodiment of the present invention is described below with reference to FIGS. 3A and 3B.

Figure 3A:
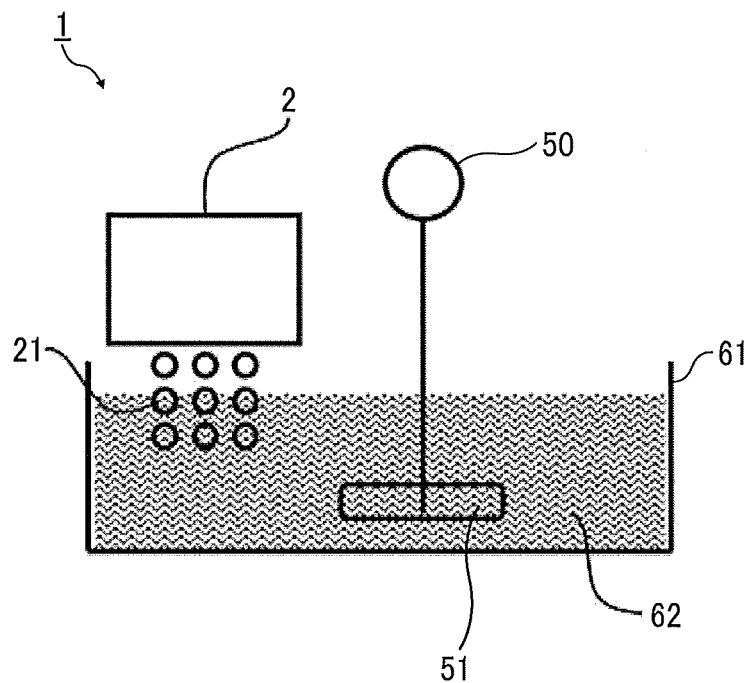
FIG. 3A is a schematic view of an apparatus for manufacturing resin particles according to an embodiment of the present invention.
Figure 3B:
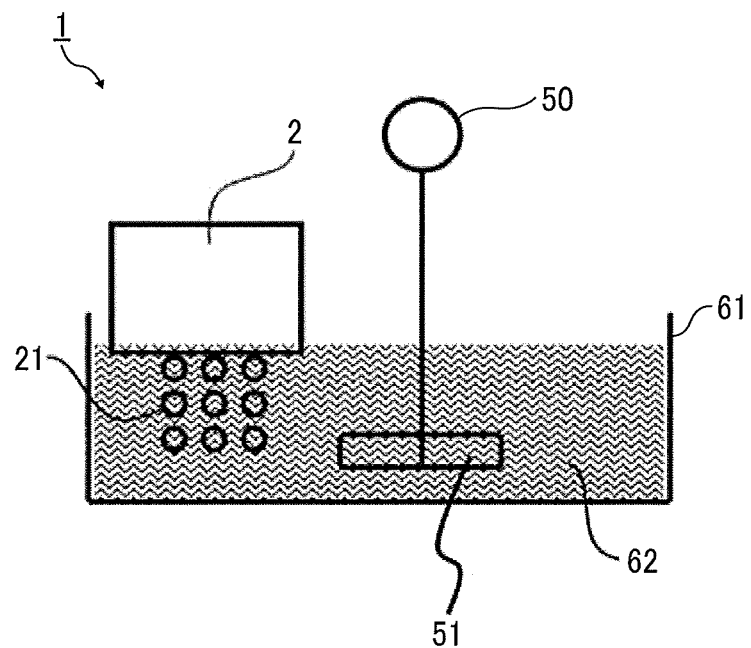
FIG. 3B is a schematic view of an apparatus for manufacturing resin particles according to an embodiment of the present invention.

FIGS. 3A and 3B are schematic views of an apparatus for manufacturing resin particles equipped with a stirrer.

In an apparatus 1 for manufacturing resin particles illustrated in FIGS. 3A and 3B, the resin solution is discharged into the poor solvent 62 contained in the poor solvent container 61 that is a glass container. In FIG. 3A, the discharge holes of the solution discharger 2 are not immersed in the poor solvent 62. In FIG. 3B, the resin solution is discharged into the poor solvent 62 with the discharge holes of the solution discharger 2 immersed in the poor solvent 62.

The apparatus 1 for manufacturing resin particles illustrated in FIGS. 3A and 3B is equipped with a stirrer 50 having a stirring blade 51. The stirring blade 51 is immersed in the poor solvent 62 contained in the poor solvent container 61.

When the resin solution is discharged from the solution discharger 2 into the poor solvent 62, the stirring blade 51 is rotated to stir the poor solvent 62, thus preventing coalescence of resin particles formed from the liquid droplets 21.

Another example of the apparatus for manufacturing resin particles according to an embodiment of the present invention is described below with reference to the drawings.

One preferred method for preventing coalescence of the resin particles formed by contacting the resin solution with the poor solvent is to impart a flow of the poor solvent at the discharge holes of the solution discharger. In that respect, the embodiments illustrated in FIGS. 4 and 5 are preferred.

Figure 4:
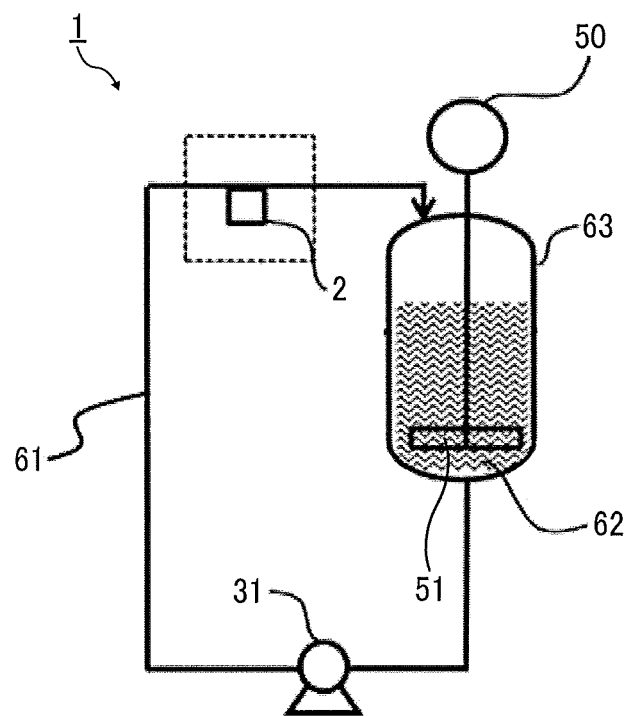
FIG. 4 is a schematic view of an apparatus for manufacturing resin particles according to an embodiment of the present invention.
Figure 5:
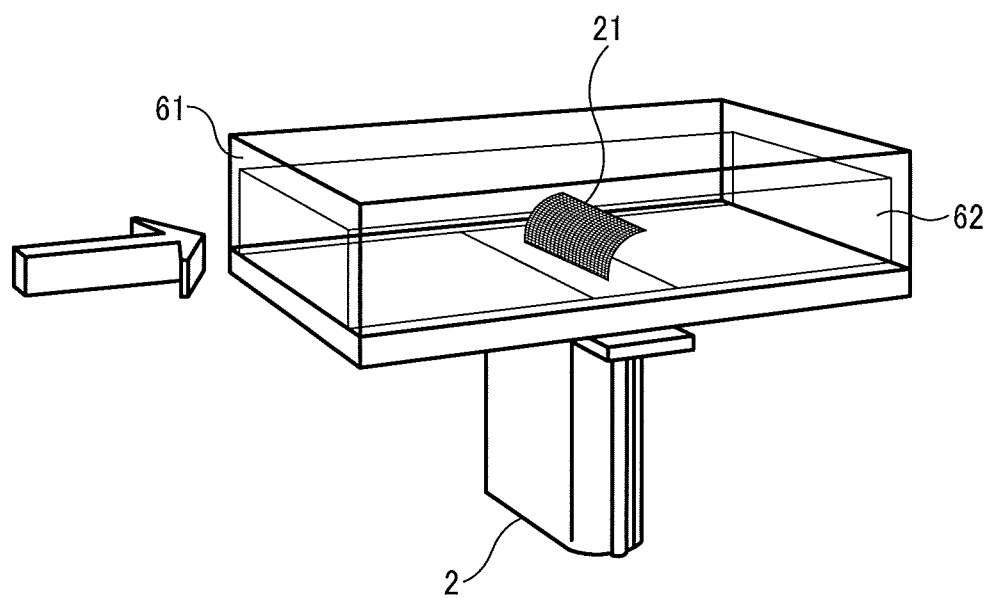
FIG. 5 is a magnified view of a solution discharger and periphery thereof in the apparatus for manufacturing resin particles illustrated in FIG. 4.

FIG. 4 is a schematic view of an apparatus for manufacturing resin particles, capable of imparting a flow of the poor solvent at the discharge holes of the solution discharger.

The apparatus for manufacturing resin particles illustrated in FIG. 4 includes a solution discharger 2, a poor solvent container 61, a stirrer 50, and a pump 31.

The poor solvent container 61 has a circulation channel capable of circulating the liquid and a tank 63 disposed on the circulation channel, serving as a part of the poor solvent container 61.

FIG. 5 is a magnified view of the solution discharger 2 and periphery thereof (enclosed by dotted lines) illustrated in FIG. 4.

The poor solvent 62 poured into the tank 63 is circulated by the pump 31 within the poor solvent container 61 via the solution discharger 2. At that time, the resin solution is discharged from the discharge holes of the solution discharger 2 into the poor solvent 62. By imparting a flow to the poor solvent 62, coalescence of the resin particles formed from the liquid droplets 21 is prevented. Preferably, the flow rate of the poor solvent 62 at the discharge holes of the solution discharger 2 is in the range of from 0.3 to 1.0 m/s.

The tank 63 is equipped with the stirrer 50 having a stirring blade 51. As the stirring blade 51 stirs the poor solvent 62, coalescence of the resin particles is more prevented.

Another example of the apparatus for manufacturing resin particles according to an embodiment of the present invention is described below with reference to the drawings.

As the content of the good solvent in the liquid is increased, coalescence of the resin particles is increased and the particle diameter thereof coarsens. To prevent such a phenomenon, it is preferable that the good solvent is removed from within the liquid and the content of the good solvent in the liquid is kept as small as possible.

Figure 6:
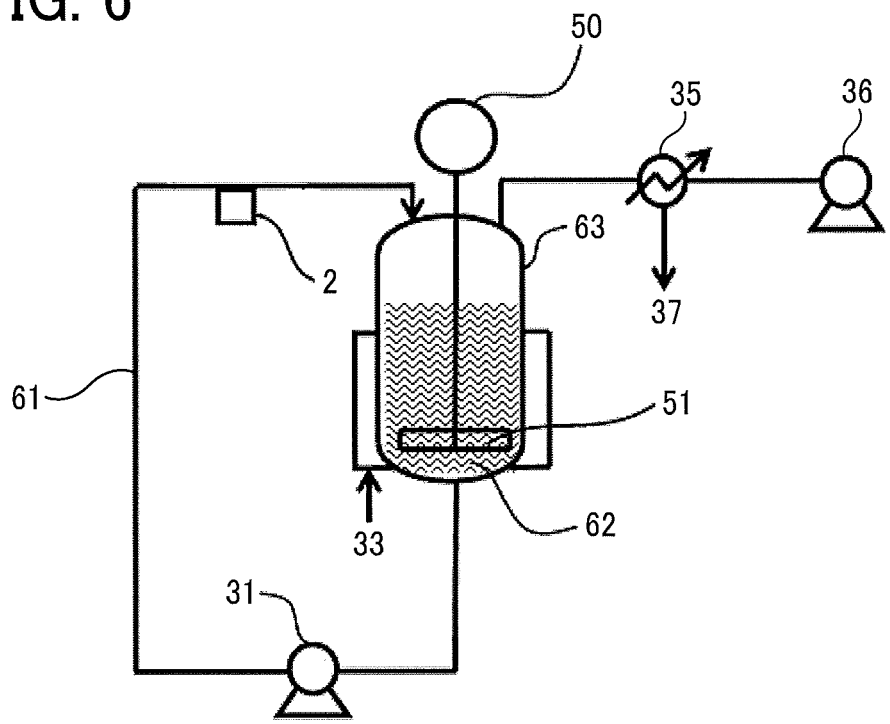
FIG. 6 is a schematic view of an apparatus for manufacturing resin particles according to an embodiment of the present invention.

FIG. 6 is a schematic view of an apparatus for manufacturing resin particles equipped with a good solvent remover.

The apparatus for manufacturing resin particles illustrated in FIG. 6 includes a solution discharger 2, a poor solvent container 61, a stirrer 50, a pump 31, a heater 33, and a decompressor (vacuum pump) 36. The heater 33 and the decompressor 36 serve as the good solvent remover.

The solution discharger 2 and periphery thereof have the same configuration as those illustrated in FIGS. 4 and 5.

The poor solvent container 61 has a circulation channel capable of circulating the liquid and a tank 63 disposed on the circulation channel, serving as a part of the poor solvent container 61.

The poor solvent 62 poured into the tank 63 is circulated by the pump 31 within the poor solvent container 61 via the solution discharger 2. At that time, the resin solution is discharged from the discharge holes of the solution discharger 2 into the poor solvent 62. By imparting a flow to the poor solvent 62, coalescence of the resin particles formed from the liquid droplets 21 is prevented.

The good solvent is removed from within the poor solvent 62 by the heater 33 and the decompressor 36 provided in the tank 63. For example, the decompressor 36 may decompress the poor solvent 62 while the heater 33 heats the poor solvent 62, so that the good solvent, having a lower boiling point than the poor solvent, is vaporized. The vaporized good solvent is condensed by a condenser 35 and collected via a collection pipe 37.

The resin particles manufactured by the method and apparatus for manufacturing resin particles according to some embodiments of the present invention have the following properties.

Properties of Resin Particles
Average Volume-Based Diameter

The resin particles have an average volume-based particle diameter of 100 nm or less, preferably from 10 to 50 nm, more preferably from 10 to 40 nm, and particularly preferably from 10 to 30 nm.

The average volume-based particle diameter of the resin particles can be measured with a Fiber-Optics Particle Analyzer (FPAR-1000 available form Otsuka Electronics Co., Ltd.) employing a dynamic light scattering method for measuring thick systems.

EXAMPLES

Further understanding can be obtained by reference to certain specific examples which are provided herein for the purpose of illustration only and are not intended to be limiting.

In the following descriptions, "discharge hole" may be referred to as "nozzle".

Example 1

Preparation of Resin Solution

First, 5 parts by mass of polyvinylidene fluoride (PVDF, KYNAR ADS2, available from ARKEMA K.K.) was dissolved in a good solvent in which 497.5 parts by mass of acetone and 497.5 parts by mass of tetrahydrofuran (THF, available from Wako Pure Chemical Industries, Ltd.) were mixed, using a stirrer, to obtain a resin solution 1.

Next, 1.5 parts by mass of a polyvinyl alcohol (PVA, 363170, available from Sigma-Aldrich Co. LLC) was dissolved in 498.5 parts by mass of ion-exchange water to prepare a 0.3% by mass PVA aqueous solution serving as a poor solvent of the PVDF. The PVA aqueous solution was poured into the poor solvent container 61 made of glass illustrated in FIG. 3B.

Preparation of Resin Particles

Using the apparatus for manufacturing resin particles illustrated in FIG. 3B, the resin solution was discharged into the poor solvent (i.e., the 0.3% by mass PVA aqueous solution) being stirred by the stirrer 50 at a revolution of 200 rpm. Thus, a liquid containing resin particles (PVDF particles) was prepared. At this time, the temperature of the poor solvent was 25 degrees C.

Nozzle diameter: 50 μm
Number of nozzle holes: 384
Discharger: Flat plate nozzle
Liquid feed pressure: 0.03 MPa
Solution discharge system: Pressurization (Compressed Air)
Drive frequency: 0 kHz
Voltage applied to piezoelectric body: 0 V
Immersion depth of nozzle in poor solvent: 3.0 mm Removal of Good Solvent While the liquid was stirred at a revolution of 200 rpm, a decompression treatment was performed at −50 kPa for 24 hours to remove the good solvent (i.e., mixture of acetone and ethanol) from the liquid. Thus, a suspension of the resin particles ("PVDF particle suspension") was prepared.

Evaluation of Particle Size Distribution

Figure 7:
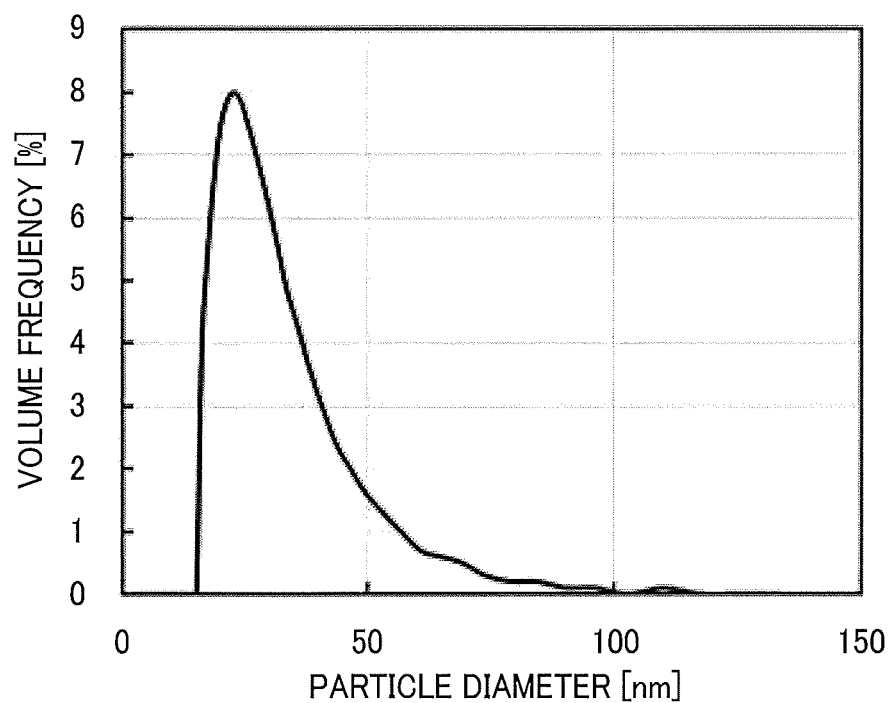
FIG. 7 is a graph showing a particle size distribution of particles prepared in Example 1.

The PVDF particle suspension was subjected to a measurement of the average volume-based particle diameter by a Fiber-Optics Particle Analyzer (FPAR-1000 available form Otsuka Electronics Co., Ltd.) employing a dynamic light scattering method for measuring thick systems. The results are shown in Table 2. The particle size distribution is shown in FIG. 7.

The concentration of PVDF particles in the PVDF particle suspension to be subjected to the measurement was adjusted to 0.1% by mass. The average volume-based particle diameter (nm) was determined by a CONTIN method by setting the integrating time per measurement to 180 seconds. The measurement was performed three times and the measured values were averaged to determine the average volume-based particle diameter (nm).

Evaluation of Production Efficiency

The production efficiency was evaluated according to the following evaluation criteria.

Evaluation Criteria

Good: The concentration of the resin solution is 0.5% by mass or more and the average volume-based particle diameter of the produced resin particles is 100 nm or less.

Poor: The concentration of the resin solution is less than 0.5% by mass or the average volume-based particle diameter of the produced resin particles is 100 nm or more.

Overall Evaluation

Among the above evaluation results, the lowest judgment result was taken as a comprehensive evaluation result. The results are shown in Table 2.

Example 2

The procedure in Example 1 was repeated except for changing the PVDF concentration in the resin solution from 0.5% by mass to 1.0% by mass and replacing the poor solvent with another consisting of ion-exchange water only, thus obtaining resin particles (PVDF particles).

The resin particles were evaluated in the same manner as in Example 1. The results are shown in Table 2.

Example 3

The procedure in Example 1 was repeated except for changing the resin from PVDF to polylactic acid (PLA, RESOMER R203H, available from Sigma-Aldrich Co. LLC.), thus obtaining resin particles (PLA particles).

The resin particles were evaluated in the same manner as in Example 1. The results are shown in Table 2.

Example 4

The procedure in Example 1 was repeated except for changing the discharge conditions as follows, thus obtaining resin particles (PVDF particles).

The resin particles were evaluated in the same manner as in Example 1. The results are shown in Table 2.

Nozzle diameter: 10 μm
Number of nozzle holes: 384
Discharger: Flat plate nozzle
Liquid feed pressure: 0 MPa
Solution discharge system: Liquid column resonance
Drive frequency: 320 kHz
Voltage applied to piezoelectric body: 10 V
Immersion depth of nozzle in poor solvent: 3.0 mm

Example 5

The procedure in Example 4 was repeated except for changing the resin to polylactic acid (PLA), thus obtaining resin particles (PLA particles).

The resin particles were evaluated in the same manner as in Example 1. The results are shown in Table 2.

Example 6

The procedure in Example 1 was repeated except that the resin was changed to polylactic acid (PLA), the discharger was changed from the flat plate nozzle to a two-fluid nozzle (6552-1/8JAC mini type, available from Spraying Systems Co.), and the discharge conditions were changed as follows, thus obtaining resin particles (PLA particles). The results are shown in Table 2.

Nozzle diameter: 500 μm
Air pressure for droplet formation: 0.1 MPa

Example 7

The procedure in Example 1 was repeated except that the resin was changed to polylactic acid (PLA), the discharger was changed from the flat plate nozzle to a membrane vibration nozzle (membrane vibration nozzle of Deodorant PUFF PUFF, available from Johnson & Johnson K.K.), and the discharge conditions were changed as follows, thus obtaining resin particles (PLA particles). The resin particles were evaluated in the same manner as in Example 1. The results are shown in Table 2.

Shape of discharge hole: True circle
Nozzle diameter: 5 μm
Number of nozzle holes: 85
Applied voltage: 20.0 V
Drive frequency: 52 kHz
Outer diameter of nozzle plate: 8.0 mm
Average thickness of nozzle plate: 20 μm
Material of nozzle plate: Nickel plate

Comparative Example 1

The procedure in Example 1 was repeated except for changing the solution discharge system from the liquid-column-resonant-type solution discharger to a TEFLON (trademark) tube having an inner diameter of 1.0 mm, thus obtaining resin particles (PVDF particles). The resin particles were evaluated in the same manner as in Example 1. The results are shown in Table 2.

Comparative Example 2

The procedure in Comparative Example 1 was repeated except for changing the PVDF concentration in the resin solution from 0.5% by mass to 0.1% by mass, thus obtaining resin particles (PVDF particles). The resin particles were evaluated in the same manner as in Example 1. The results are shown in Table 2.

Comparative Example 3

The procedure in Example 3 was repeated except for changing the solution discharger from the flat plate nozzle to a TEFLON (trademark) tube having an inner diameter of 1.0 mm, thus obtaining resin particles (PLA particles). The resin particles were evaluated in the same manner as in Example 3. The results are shown in Table 2.

TABLE 1

| | Resin | | Good Solvent | | | | Poor Solvent | | | |
| | | | | | | | Resin | | Additive | |
| | Type | Content (parts by mass) | Type 1 | Content (parts by mass) | Type 2 | Content (parts by mass) | Solution Concentration (% by mass) | Type | Content (parts by mass) | Type | Content (parts by mass) |
|---|---|---|---|---|---|---|---|---|---|---|---|
| Example 1 | PVDF | 5 | Acetone | 497.5 | THF | 497.5 | 0.5 | Water | 498.5 | PVA | 1.5 |
| Example 2 | PVDF | 10 | Acetone | 495 | THF | 495 | 1 | Water | 500.0 | — | — |
| Example 3 | PLA | 5 | Acetone | 497.5 | Ethanol | 497.5 | 0.5 | Water | 498.5 | PVA | 1.5 |
| Example 4 | PVDF | 5 | Acetone | 497.5 | THF | 497.5 | 0.5 | Water | 498.5 | PVA | 1.5 |
| Example 5 | PLA | 5 | Acetone | 497.5 | THF | 497.5 | 0.5 | Water | 498.5 | PVA | 1.5 |
| Example 6 | PLA | 5 | Acetone | 497.5 | THF | 497.5 | 0.5 | Water | 498.5 | PVA | 1.5 |
| Example 7 | PLA | 5 | Acetone | 497.5 | THF | 497.5 | 0.5 | Water | 498.5 | PVA | 1.5 |
| Comparative Example 1 | PVDF | 5 | Acetone | 497.5 | THF | 497.5 | 0.5 | Water | 498.5 | PVA | 1.5 |

TABLE 1-continued

|  | Resin | | Good Solvent | | | | Resin | | Poor Solvent | | | |
| --- | --- | --- | --- | --- | --- | --- | --- | --- | --- | --- | --- | --- |
|  | | | | | | | | | | | Additive | |
|  | Type | Content (parts by mass) | Type 1 | Content (parts by mass) | Type 2 | Content (parts by mass) | Solution Concentration (% by mass) | Type | Content (parts by mass) | Type | Content (parts by mass) |
| Comparative Example 2 | PVDF | 1 | Acetone | 499.5 | THF | 499.5 | 0.1 | Water | 498.5 | PVA | 1.5 |
| Comparative Example 3 | PLA | 5 | Acetone | 497.5 | Ethanol | 497.5 | 0.5 | Water | 498.5 | PVA | 1.5 |

TABLE 2

|  |  |  |  | Evaluation Results | | |
| --- | --- | --- | --- | --- | --- | --- |
|  | Discharger | Immersion of Nozzle in Poor Solvent | Nozzle diameter (μm) | Average Volume-based Diameter (nm) | Productivity | Overall Evaluation |
| Example 1 | Flat plate nozzle (No vibration) | Yes | 50 | 70 | Good | Good |
| Example 2 | Flat plate nozzle (No vibration) | Yes | 50 | 90 | Good | Good |
| Example 3 | Flat plate nozzle (No vibration) | Yes | 50 | 60 | Good | Good |
| Example 4 | Flat plate nozzle (Liquid resonance) | Yes | 10 | 60 | Good | Good |
| Example 5 | Flat plate nozzle (Liquid resonance) | Yes | 10 | 40 | Good | Good |
| Example 6 | Two-fluid nozzle | No | 500 | 90 | Good | Good |
| Example 7 | Membrane vibration nozzle | No | 5 | 30 | Good | Good |
| Comparative Example 1 | Tube | Yes | 1,000 | 130 | Poor | Poor |
| Comparative Example 2 | Tube | Yes | 1,000 | 90 | Poor | Poor |
| Comparative Example 3 | Tube | Yes | 1,000 | 160 | Poor | Poor |

In Examples 1 to 7, fine nanoparticles having an average volume-based particle diameter of less than 100 nm were obtained, although there are some variations in the average volume-based particle diameter depending on the concentration of the resin solution and the nozzle diameter. These resin particles having a size of 100 nm or less were obtained without adding any additive such as PVA to the poor solvent. On the other hand, in Comparative Examples 1 to 3, the average volume-based particle diameter of the resin particles prepared from the resin solution having the same resin solution concentration was remarkably coarsened as compared with those of the Examples. For example, when comparing Example 1 with Comparative Example 1, the average volume-based particle diameter of the prepared particles differed by about 2.3 times. Further, when preparing nanoparticles having a size of 100 nm or less with the solution discharger in the Comparative Examples, it was necessary to reduce the concentration of the resin solution to 0.1% by mass. According to embodiments of the present invention, nanoparticles having a size of 100 nm or less can be prepared even when the concentration of the resin solution is 1% by mass or more and the amount of the organic solvent for dissolving the resin can be thereby reduced to 1/10 or less, thus contributing to improvement of production efficiency and reduction of environmental load.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A method for manufacturing resin particles, comprising:
    dissolving a resin free of poly(lactic-co-glycolic acid) (PLGA) in a good solvent of the resin to prepare a resin solution; and
    discharging the resin solution from at least one discharge hole having an inner diameter of less than 1,000 μm into a poor solvent of the resin such that the resin solution diffuses, the resin comes into contact with the poor solvent, and the resin solidifies to form resin particles, wherein the discharging includes circulating the poor solvent,
    removing the good solvent from within the poor solvent that is circulating,
    wherein the good solvent is removed from within the poor solvent that is circulating by decompressing the poor solvent using a decompressor while heating the poor solvent with a heater, and
    wherein an average volume-based particle diameter of the resin particles is 100 nm or less.

2. The method according to claim 1, wherein the resin comprises at least one of polyvinylidene fluoride (PVDF) and polylactic acid (PLA).

3. The method according to claim 1, wherein the inner diameter of the discharge hole is 50 μm or less.

4. The method according to claim 1, wherein the discharging includes applying a vibration to the resin solution.

5. The method according to claim 4, wherein the vibration has a frequency of 1 kHz or higher.

6. The method according to claim 1, wherein the discharging includes applying a pressure of 0.01 MPa or more to the poor solvent.

7. The method according to claim 1, wherein the discharging includes causing the poor solvent to flow at a flow rate of from 0.5 to 2.0 m/s.

8. The method according to claim 1, wherein the average volume-based particle diameter of the resin particles is 10 nm to 50 nm.

9. The method according to claim 1, wherein the average volume-based particle diameter of the resin particles is 10 nm to 40 nm.

10. The method according to claim 1, wherein the average volume-based particle diameter of the resin particles is 10 nm to 30 nm.

11. The method according to claim 1, wherein a concentration of the resin solution is 0.5% by mass or more.

12. The method according to claim 1, wherein the good solvent is capable of dissolving 0.1 g or more of the resin in 100 g of the solvent at 25 degrees C.

13. The method according to claim 1, wherein the poor solvent is capable of dissolving at most 0.05 g of the resin in 100 g of the solvent at 25 degrees C.

14. A method for manufacturing resin particles, comprising:
dissolving a resin free of poly(lactic-co-glycolic acid) (PLGA) in a good solvent of the resin to prepare a resin solution; and
discharging the resin solution from at least one discharge hole having an inner diameter of less than 1,000 μm into a poor solvent of the resin such that the resin solution diffuses, the resin comes into contact with the poor solvent, and the resin solidifies to form resin particles,
wherein an average volume-based particle diameter of the resin particles is 100 nm or less,
wherein the resin comprises at least one of polyvinylidene fluoride (PVDF) and polylactic acid (PLA).

15. The method according to claim 14, wherein the good solvent is capable of dissolving 0.1 g or more of the resin in 100 g of the solvent at 25 degrees C.

16. The method according to claim 14, wherein the poor solvent is capable of dissolving at most 0.05 g of the resin in 100 g of the solvent at 25 degrees C.

* * * * *